Figures 1, 2:
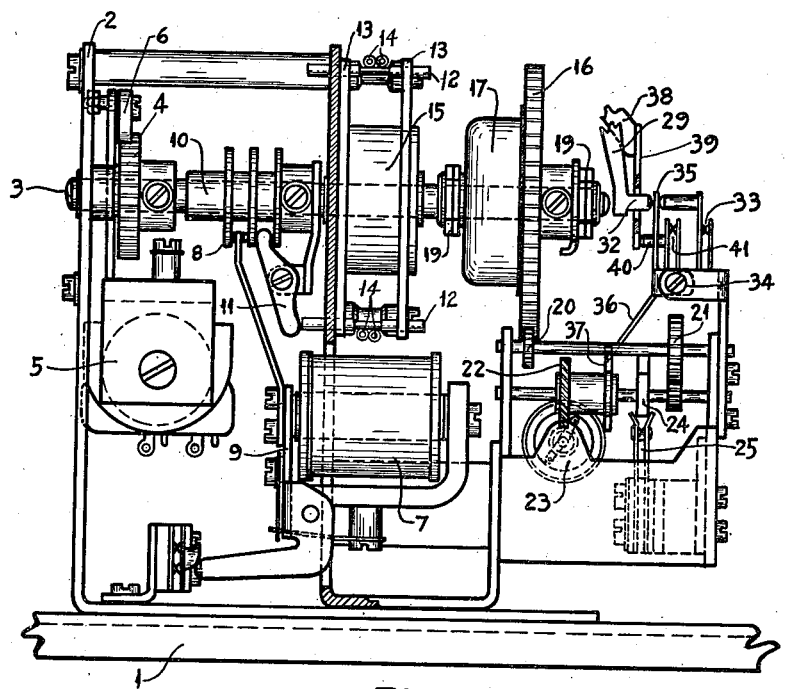

July 8, 1941.　　　　K. MÜLLER　　　　2,248,774
MECHANICAL IMPULSE REPEATER
Filed Feb. 6, 1939　　　2 Sheets-Sheet 1

INVENTOR.
KONRAD MÜLLER
BY
ATTORNEY.

July 8, 1941.  K. MÜLLER  2,248,774

MECHANICAL IMPULSE REPEATER

Filed Feb. 6, 1939  2 Sheets-Sheet 2

INVENTOR.
KONRAD MÜLLER
BY
ATTORNEY.

UNITED STATES PATENT OFFICE 2,248,774

MECHANICAL IMPULSE REPEATER

Konrad Müller, Berlin-Spandau, Germany, assignor to Fides Gesellschaft fur die Verwaltung und Verwertung von gewerblichen Schutzrechten m. b. H., Berlin, Germany Application February 6, 1939, Serial No. 254,828
In Germany February 26, 1938

7 Claims. (Cl. 179—16)

The subject of the invention is a control device for signalling devices, in particular for impulse repeaters in telephone systems, in which a regulated assessor is controlled by displaceable projections on a mechanical storage device. The invention concerns a construction of the control device simplifying the arrangement of such signalling devices and reducing the amount of space taken up by them.

Impulse repeaters are known in which the number of impulses in each outgoing impulse train is determined and fixed by an assessor, this comprising a motor driven member normally rotating at constant speed but stopped at intervals by displaceable projections introduced into its path under control of the incoming impulse trains. Means are provided for restoring each projection to normal when it is encountered, thereby to permit the assessor to resume its rotation after a slight delay. In known arrangements there is the disadvantage that the projections engage the assessor directly for the purpose of stopping it, whereby projections have to undergo considerable forces. This leads to their rapid wearing out and necessitates the use of projections which are particularly strong and which are spaced at a considerable distance from the centre of the assessor in order that the circumferential forces on the projection shall not be too large. In this way the amount of space required is increased. Further, since the projections must take up the whole of the rotary movement of the assessor undesired friction in their guides occurs when they are set back, which in certain conditions can lead to a failure of the setting back operation to function.

The subject of the invention avoids these disadvantages in that the characterizing projections effect the stopping of the assessor switch over a contact lever rotating with the assessor. By the arrangement of the contact lever, which merely tests the projections, the stopping arrangement for the assessor which damages the projections is avoided. The setting back of the projections is not prevented as the assessor does not exert any force upon them. They can be comparatively small and be arranged on a support of small diameter. The use of the projections is reduced to a minimum. According to the invention the contact lever controls a fixed locking lever operating the locking cams whereby the locking cams are arranged on a shaft driven from the assessor through the intermediary of transferring gear. In this way it is arranged that the fixing of the assessor to its shaft is performed with a small rotary movement, so that for its release only a small force is necessary.

In known arrangements the release of the assessor by the release magnet is effected over an impulse rod controlling a lever which rotates with the assessor and is arranged in the hollow shaft of the assessor and of the setting device. In this way the apparatus is unnecessarily complicated and expensive.

The present invention avoids these disadvantages further in that an armature controlled from a fixed release magnet rotates with the assessor to effect the necessary setting back of the characterizing projections for their release. By the connection of the armature with the assessor, special transferring members between the fixed magnet and the setting back device are avoided. The shaft which is common to the setting device for storage and to the assessor can be arranged to be compact. In this way the armature is so arranged that in the attracted position of the contact lever it locks in the position effecting the locking of the assessor. In this way in simple manner it is arranged that the complete return of the release armature to its normal position cannot set the assessor into motion. The movement of the contact lever as well as of the armature can be arranged for electrical characterizing of the previous operating position of the signalling device, so that rotating contact parts i. e., a contact transmission over mechanical parts of the signalling device coming into contact with one another, are avoided. According to the invention this result is obtained in that over the contact lever fixed contact members are operated for electrical characterizing of the completion of the rotation. Also the contacts over which the discharge device is characterized, are in contrast to known devices arranged to be fixed in the present invention and this is done by means of a lever controlled by a projection displaced on the operation of the assessor which influences fixed contact members for characterizing the discharge of the storage device. In order to obtain a device which is arranged concentrically as far as possible the previously mentioned lever is provided with a ring flange with which it operates the associated contact member and embraces the end of the contact lever which engages with the contact lever. The release magnets are conveniently arranged concentric to the projections of the storage device in order to produce a concentric and compact arrangement. A further simplification is produced in that the assessor is integral with a housing containing a driving spring whereby the housing is arranged as an additional axle bearing for the assessor. In this way the assessor is firmly fixed and the use of bearing parts is reduced. This is of special advantage since the contact lever and the parts controlling the contacts are arranged on the assessor, which accordingly must be fixed extremely well in an adjustable position.

The assessor is conveniently arranged to be loose on the axle by providing a sleeve, so that by the release of the sleeve all the parts of the assessor can be removed together from the lever and the projections as well as the magnet are accessible from the side of the assessor.

According to the invention a particularly compact construction of the entire signalling device is produced by arranging the control device and the remaining parts of the signalling device within the special limits determined by the common shaft and the projections. By this arrangement of the parts and by their construction mentioned above, the signalling device is arranged to take up a very small space so that without any further alteration it can be mounted on the frame of a usual set of relays for a telephone system.

In the following the subject of the invention is described and represented in the accompanying drawings.

Figure 3:
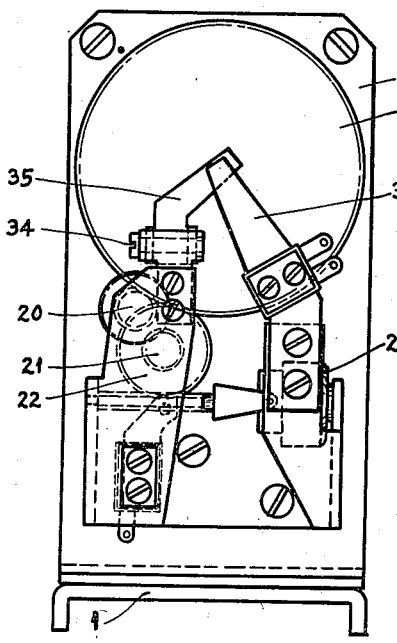
Figure 4:
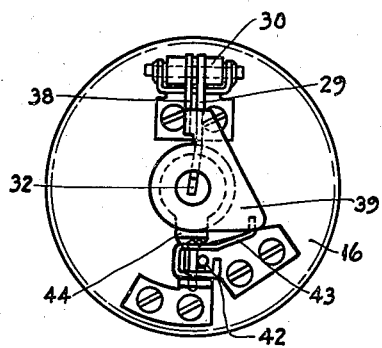
Figure 5:
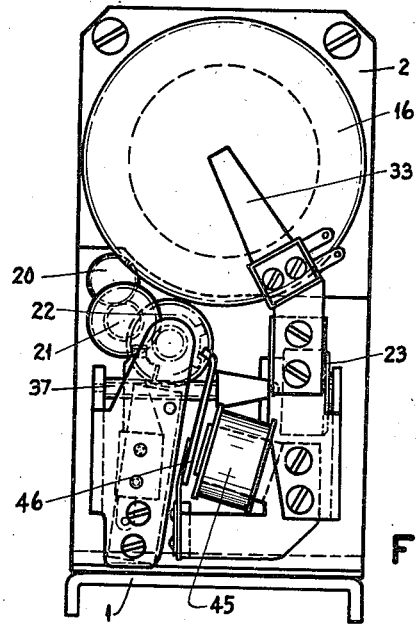

Fig. 1 is a side view of the signalling device,
Fig. 2 is a plan view in partial section,
Fig. 3 is a front view,
Fig. 4 is a view of part of the marking device, and
Fig. 5 is a front view of the signalling device of another embodiment.

On a base plate or a relay strip 1 a frame 2 is fixed. The frame 2 serves to support a shaft 3 which passes from side to side and supports a cogwheel 4. A displacing magnet 5 can step on the cogwheel over a pawl 6 and hence rotate the shaft 3. A further magnet 7 arranged on the frame 2 engages with an extension 8 on its armature 9 on a sleeve 10 arranged to move on the axle 3 and the magnet can displace this sleeve along the axle. The sleeve 10 operates a lever 11 controlled by a restoring spring (not shown) and the free end of the lever serves to displace pins 12. The pins 12 are circularly arranged in openings in two discs 13 and are held in position by a helical ring 14 which is common to them all; the ring serves to limit the endwise displacement of the pins 12 in such a way that they can only move axially between two predetermined end positions. Within the space enclosed by the pins 12 an electromagnet 15 is arranged, through the hollow core of which the shaft 3 extends. It is convenient to make the shaft 3 of material which is non-magnetic. A cogwheel 16 is supported on the shaft 3 and is connected with a housing 17 for a spring. The housing 17 and the cogwheel 16 are arranged on a common sleeve 19 which is fixed on the axle 3 by means of two portions which screw together. The cogwheel constitutes the so-called assessor of the signalling device. The housing 17 contains a spring, not shown in the figure, which drives the cogwheel 16, and is connected at one end with the sleeve 18 and at the other end over the housing 17 with the cogwheel 16. The cogwheel 16 engages over a gear 20, 21, 22 with a centrifugal governor 23, which acts as a brake. An impulse wheel 24 is connected to the shaft of the repeating wheel 21 and controls the impulse contact 25. For accurate setting of the impulses the impulse contact is arranged to be displaceable with respect to the impulse wheel 24. A lever 27 is arranged on the cogwheel 16 to rotate about the pivot 26 and serves as an armature for the magnet 15. The armatures 27 have an end 28 which rests against the pins 12, so that in its normal position the pin displaced to the right does not touch it in the unoperated position of the armature. Further, on the cogwheel 16 a contact lever 29 is arranged to rotate about a pivot 30 and engages at its end 31 in the path of the projections which are displaced towards the right. At its other end 32 it operates contact springs 33 when it is displaced. Moreover, it engages with a lever 35 rotatable about a pivot 34, the end 36 of which in its normal position projects into the path of cams of the camwheel 37 which is mounted on the axle 21 of the cogwheel. Further, the lever 38 is arranged to rotate about the pivot 30 on the cogwheel 16 and is provided with a ring flange 39 which encircles the end 32 of the contact lever 29 and works in conjunction with the contact tip 40 of the set of contact springs 41. On the cogwheel 16 a projection 42 is provided which, in the normal position, presses against the lever 43, which operates on the ring flange 39 in such a manner that the lever 38 in Figure 2 is pushed towards the right and the corresponding contact 41 is maintained closed. The projection 42 serves at the same time as an end stop for the cogwheel 16, as on the completion of the operation of the cogwheel 16 the projection meets a projection 44 which is rotated together with the shaft 3.

The mehod of working of the arrangement is as follows: On the connection of a signalling device the magnet 7 operates and displaces the sleeve 10 towards the right, so that the lever 11 is moved away from the pins 12. The incoming impulses operate the magnet 5, which over the pawl drive 4, 6 displaces the axle 3 one step for each impulse. At the end of each impulse train the relay 7 restores so that the lever 11 in its normal position displaces one of the pins 12 to the right. During the setting operation the magnet 15 operates and thereby attracts its armature 27 which by means of its end 28 presses the pin 12 opposite to which it stands, which is still displaced from the last setting, to the left. In this way the contact lever 29 is free and as soon as the armature 27 has travelled back to its normal position the left-hand end of the contact lever in Fig. 2 rotates upwards since now the end of the armature 27 has rotated out of reach of the end 31 of the contact lever 29 whereby the end 32 of the contact lever 29 opens the contact 33 and at the same time the armature 36 of the lever 35 is displaced out of reach of the cam 37. The locking arrangement for the drive 20, 21, 22 is now out of action, so that under the control of the spring within the housing 17 the cogwheel 16 begins to rotate, and over the drive previously mentioned displaces the impulse disc 24 which operates the impulse contact. When lever 29, in the course of the rotation of the cogwheel 16, reaches one of the displaced pins 12, it is pressed down and closes the contact 33 to characterize the completed rotation for this train and frees the lever 35, which travels back to contact the cams 37 and so stops the assessor 16. By corresponding switching operations the magnet is energized again in the case of further impulse trains until the projection 42 reaches the projection 44, presses the lever 38 in Fig. 1 towards the right and hence closes the contact 41 opened at the beginning of the rotation which sends out the signal for the complete discharge of the storage device. As is clear from the figures, the construction of the arrangement is such that it falls within the space limited by the axle 3 and the projecting pins 12. In this way the arrangement is very compact, so that it can be enclosed within the usual relay cover in telephone systems. Contact noise over movable parts or parts of the signalling device coming mechanically into contact with one another are avoided. The shaft 3 in view of the arrangement of the release magnet 15 can be arranged to be a simple axle. The accessibility of the parts is insured by the ease with which the cogwheel 16 forming the assessor and the lever fixed thereto can be released. The support for the assessor 16 on the axle 3 is extremely firm, so that satisfactory adjustment of the levers 27, 28, 29 and 33 arranged on it with respect to the parts with which they engage is always obtained. The projections or pins 12 are included in the smallest possible space and require only the smallest of forces from the lever 35. The diameter of the drum formed by the pins 12 determining the breadth of the signalling device can be kept small since the projections 13 undergo no circumferential force due to the use of the contact lever 19.

Fig. 5 shows a signalling device in which, instead of the lever 35, an electromagnet 45 controlled by the contacts 33 is provided which controls the cam 37 by means of its armature 46. In this way the loading of the contact lever 29 by means of the locking lever 35 is avoided and it is possible to release or fix the signalling device by corresponding closing or opening of the circuit for the magnet 45 independently of the pins 12.

What is claimed is:

1. In combination, a circular series of parallel, longitudinally movable pins, the corresponding ends of all pins lying in or near a common plane and the opposite ends of all pins lying in or near another common plane, whereby said pins and said two planes describe and substantially enclose a generally cylindrical space, a rotary arm, means for rotating said arm over said corresponding ends of said pins, and an electromagnet lying at least partly within said enclosed space for at times operating said arm when same is over the end of a pin to move that pin longitudinally.

2. In combination, a circular series of parallel pins, each of said pins having a normal position such that the corresponding ends of all pins at normal lie in a common plane and such that the opposite ends of all pins at normal line in another common plane, whereby said pins and said two planes describe and substantially enclose a generally cylindrical space, means for displacing any of said pins axially, a rotary arm, means for rotating said arm over the ends of said pins, and an electromagnet lying generally within said enclosed space for at times operating said arm when same is over the end of a displaced pin to restore that pin to normal.

3. In combination, a series of parallel pins each having a normal position, a movable member, a motor for moving said member, an arm carried by said member and adapted, during movement of the member by said motor, to pass over the ends of all of said pins occupying their normal positions, means for displacing any one of said pins longitudinally from its normal position into the path of said arm to cause said arm, upon impact with the displaced pin, to move with respect to said member, and means linked to said arm and operated mechanically thereby responsive to the movement of said arm with respect to said member for halting the movement of said member by said motor.

4. In combination, a series of parallel pins each having a normal position, a movable member, a motor for moving said member, an arm carried by said member and adapted, during movement of the member by said motor, to pass over the ends of all of said pins occupying their normal positions, means for displacing any one of said pins longitudinally from its normal position into the path of said arm to cause said arm, upon impact with the displaced pin, to move with respect to said member, a contact linked to said arm and operated mechanically thereby responsive to the movement of said arm with respect to said member, an electromagnet controlled by said contact, and means controlled magnetically by said electromagnet for halting the movement of said member responsive to the operation of said contact.

5. In combination, a series of parallel pins each having a normal position, a movable member, a motor for moving said member, an arm carried by said member and adapted, during movement of the member by said motor, to pass over the ends of all of said pins occupying their normal positions, means for displacing any one of said pins longitudinally from its normal position into the path of said arm to cause said arm, upon impact with the displaced pin, to move with respect to said member, means linked to said arm and operated mechanically thereby responsive to the movement of said arm with respect to said member for halting the movement of said member by said motor, a second arm carried by said member, and means for operating said second arm to restore the displaced pin to normal.

6. A combination as claimed in claim 5, wherein said series of parallel pins are located in a circle with their corresponding ends lying in or near a common plane, and wherein said last means includes an electromagnet lying generally within the space defined by said circle of pins.

7. In combination, an electromagnet, a plurality of pins each parallel to the longitudinal axis of said electromagnet, said pins being equidistant from said axis and arranged in a circle around said axis, a member rotatable about said axis, means for rotating said member to a position opposite the end of any of said pins, and said member operated by said electromagnet responsive to energization thereof when said member is opposite the end of a pin to move that pin longitudinally.

KONRAD MÜLLER.